(12) United States Patent
Bajic

(10) Patent No.: US 7,515,573 B2
(45) Date of Patent: Apr. 7, 2009

(54) METHOD, SYSTEM AND APPARATUS FOR CREATING AN ACTIVE CLIENT LIST TO SUPPORT LAYER 3 ROAMING IN WIRELESS LOCAL AREA NETWORKS (WLANS)

(75) Inventor: Zeljko Bajic, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 309 days.

(21) Appl. No.: 11/116,660

(22) Filed: Apr. 27, 2005

(65) Prior Publication Data

US 2006/0245404 A1    Nov. 2, 2006

(51) Int. Cl.
*H04L 12/56* (2006.01)
(52) U.S. Cl. ..................... 370/338; 370/389
(58) Field of Classification Search .............. 370/313, 370/331, 338, 328, 389; 713/168; 455/552.1
See application file for complete search history.

(56) References Cited

U.S. PATENT DOCUMENTS

| | | | |
|---|---|---|---|
| 6,055,433 | A | 4/2000 | Yuan et al. |
| 6,404,772 | B1 | 6/2002 | Beach et al. |
| 6,795,701 | B1 | 9/2004 | Baker et al. |
| 6,901,270 | B1 | 5/2005 | Beach |
| 6,928,282 | B2 | 8/2005 | Taniguchi |
| 7,113,498 | B2 | 9/2006 | Bajic |
| 7,173,922 | B2 | 2/2007 | Beach |
| 7,173,923 | B2 | 2/2007 | Beach |
| 2001/0021175 | A1 | 9/2001 | Haverihen |
| 2002/0021689 | A1 | 2/2002 | Robbins et al. |

(Continued)

FOREIGN PATENT DOCUMENTS

EP    1117222    7/2001

(Continued)

OTHER PUBLICATIONS

PCT International Search Report PCT/US2006/014076, Sep. 18, 2006.

(Continued)

*Primary Examiner*—Lester Kincaid
*Assistant Examiner*—Phuoc Doan

(57) ABSTRACT

Techniques are provided for creating an active client list that can be distributed to a plurality of wireless switches. The wireless switches are located in a wireless local area network comprising a registration server, a plurality of active clients, and the plurality of wireless switches. Registration information associated with each of the active clients is communicated to the wireless switches that support those active clients. The registration information associated with each of the active clients from the wireless switches is communicated over an IP tunnel to the registration server. An active client list can then be created using the registration information for each active client. The active client list comprises a record for each active client in the wireless local area network. The record of each client comprises a MAC address of the client, a client IP address of the client, a home switch of the client, a visited switch of the client, inactivity timers for the home switch and the visited switch and location information. The active client list and the registration information for each active client can be communicated to each wireless switch.

20 Claims, 5 Drawing Sheets

U.S. PATENT DOCUMENTS

| | | |
|---|---|---|
| 2002/0067704 A1 | 6/2002 | Ton |
| 2002/0136226 A1 | 9/2002 | Christoffel et al. |
| 2002/0176387 A1 | 11/2002 | Wilmer et al. |
| 2003/0104814 A1 | 6/2003 | Gwon et al. |
| 2003/0128689 A1 | 7/2003 | Peirce, Jr. et al. |
| 2003/0135626 A1 | 7/2003 | Ray et al. |
| 2003/0179742 A1 | 9/2003 | Ogier et al. |
| 2003/0224788 A1 | 12/2003 | Leung et al. |
| 2004/0006708 A1 | 1/2004 | Mukherjee et al. |
| 2004/0047320 A1 | 3/2004 | Eglin |
| 2004/0095932 A1 | 5/2004 | Astarabadi et al. |
| 2004/0103282 A1 | 5/2004 | Meier et al. |
| 2004/0122976 A1 | 6/2004 | Ashutosh et al. |
| 2004/0214576 A1 | 10/2004 | Myers et al. |
| 2004/0221042 A1 | 11/2004 | Meier |
| 2005/0047420 A1 | 3/2005 | Shiro et al. |
| 2005/0074015 A1 | 4/2005 | Chari et al. |
| 2005/0213582 A1 | 9/2005 | Wakumoto et al. |
| 2005/0237962 A1* | 10/2005 | Upp et al. .................. 370/313 |
| 2006/0045069 A1 | 3/2006 | Zehavi et al. |
| 2006/0179307 A1* | 8/2006 | Stieglitz et al. ............ 713/168 |
| 2007/0121565 A1 | 5/2007 | Halasz et al. |

FOREIGN PATENT DOCUMENTS

| | | |
|---|---|---|
| EP | 1401151 | 3/2004 |
| EP | 1408653 | 4/2004 |
| EP | 1528747 | 5/2005 |
| WO | 0163943 | 8/2001 |
| WO | WO 02/43348 A1 | 5/2002 |
| WO | 03077429 | 9/2003 |
| WO | WO 03/093951 A1 | 11/2003 |
| WO | WO 03/101131 A1 | 12/2003 |
| WO | 2004017172 | 2/2004 |
| WO | WO 2004/098143 A1 | 11/2004 |
| WO | 2006066007 A | 6/2006 |

OTHER PUBLICATIONS

International Search Report for International Application No. PCT/US2006/014075 mailed Oct. 6, 2006.

International Search Report for International Application No. PCT/US2006/013888 mailed Nov. 8, 2006.

International Search Report for International Application No. PCT/US2006/014074 mailed Sep. 8, 2006.

International Search Report for International Application No. PCT/US2006/020216 mailed Oct. 30, 2006.

International Search Report for International Application No. PCT/US2006/020880 mailed Oct. 20, 2006.

International Search Report for International Application No. PCT/US2006/025356 mailed Nov. 30, 2006.

Dmitry Olshansky: "JPF Usage Tutorial (Demo application explained)" Internet Article, [Online] Mar. 9, 2005, pp. 1-7, XP002400718, JPF Homepage, Retrieved from the Internet: URL:http://web.archive.org/web/20050309192800/jpf.sourceforge.net/tutorial.html>, [retrieved on Sep. 27, 2006], p. 2, section "Preparing parameters to start up plug-in manager", paragraph 1-paragraph 3, p. 4, whole page.

Anonymous: "Welcome to Eclipse" Internet Article, [Online] 2004, XP002400727, Eclipse Homepage, Retrieved from the Internet: URL:http://www.eclipse.org.documentation/pdf/org.eclipse.platform.doc.isv_3.0.1.pdf> [retrieved on Sep. 27, 2006], p. 9, paragraph 1—paragraph 6; p. 10, table on bottom of page; p. 11, paragraph 2—paragraph 3; p. 12, paragraph 1—paragraph 3; p. 13, paragraph 1—paragraph 3; p. 78, paragraph 1—paragraph 2; p. 79, section "Hello world view", whole section; p. 85, figure: p. 92, section Installing examples via the.

Azad Bolour: "Notes on the Eclipse Plug-in Architecture" Internet Article, [Online] Jul. 10, 2003, pp. 1-26, XP002400728, Eclipse Homepage, Retrieved from the Internet: URL:http://web.archive.org/web/20030710042641/http://eclipse.org/articles/ Artlicle-Plug-in-architechture/plug_architecture.html> [retrieved on Sep. 27, 2006], p. 1, section "Introduction", paragraph 1—paragraph 2; p. 2, paragraph 1—paragraph 3; p. 3 section 2.3, paragraph 1—p. 4, paragraph 7.

David Flanagan: "Java Foundation Classes in a Nutshell" Sep. 1999, O'Reilly & Associates, Inc., 101 Morris Street, Sebastopol, CA 95472, U.S.A., XP002400745, section 7.2.1, whole section.

Dmitry Olshansky: "Class StandardPathResolver" Internet Article, Mar. 9, 2005, XP002400737, JPF Homepage, section "resolvePath", whole section.

Dromb Bucknell University R, "Dynamic Host Configuration Protocol," IETF Standard, Internet Engineering Task Force, ITEF, CH, Mar. 1997.

S. Glass, Sun Microsystems, Mobile IP Agents as DHCP Proxies, IETF Standard-Working-Draft, Internet Engineering Task Force, IETF, Ch. No. 1, Mar. 2, 2003 [abstract].

International Searching Authority, Annex to Form PCT/ISA/206 Communication Relating to the Results of the Partial International Search for International Application No. PCT/US2007/072556, mailed Dec. 28, 2007.

International Searching Authority, Annex to Form PCT/ISA/206 Communication Relating to the Results of the Partial International Search for International Application No. PCT/US2007/072350, mailed Nov. 22, 2007.

Ogier SRI International F. Templin Nokia M. Lewis SRI International R: "Topology Dissemination Based on Reverse-Path Forwarding (TBRPF); rfc3684.txt;" IETF Standard, Internet Engineering Task Force, IETF, CH, Feb. 2004, XP015009465; ISSN: 0000-0003; abstract; Chapters 5.1 and 7.

Leary, Jonathan et al., "Wireless LAN Fundamentals Mobility," CISCO Press article, Jan. 9, 2004, pp. 1-8.

Symbol Technologies, Inc. "ES 3000 Ethernet Switch, Designed for Enterprise Wireless Networking Wireless Switch Environments," Oct. 2004.

Symbol Technologies, Inc. "What is a Wireless Switch and the Value of the Overlay Architecture?" Techical White Paper, Jan. 2005.

Symbol Technologies, Inc. Deutsch Messe AG Chooses the Wireless Switch System from Symbol Technologies to Power World's Largest Hotspot at CeBIT 203, Oct. 2003.

The Tolly Group "Wireless TCO: The Value of An Overlay Network," White Paper, Jun. 2004.

Annex to Form PCT/ISA/206, Communication Relating to the Results of the Partial International Search for International Application No. PCT/SU2007/073917, mailed Jan. 29, 2008.

* cited by examiner

METHOD, SYSTEM AND APPARATUS FOR CREATING AN ACTIVE CLIENT LIST TO SUPPORT LAYER 3 ROAMING IN WIRELESS LOCAL AREA NETWORKS (WLANS)

TECHNICAL FIELD OF THE INVENTION

The present invention generally relates to computer networks and, more particularly, to methods, systems and apparatus for layer 3 roaming in the context of Wireless Local Area Networks (WLANs).

BACKGROUND OF THE INVENTION

WLANs, based on the IEEE 802.11 standards, have conventionally been used for ordinary Internet services such as web browsing, file transfers and electronic mail. However, with the emerging usage of real time multimedia applications such as voice over IP (VoIP) telephony, these same WLAN networks can also be used as infrastructure for enabling such applications. WLANs can give clients the ability to "roam" or physically move from place to place without being connected by wires. In the context of WLANs the term "roaming" describes the act of physically moving between access points (APs). One issue in the area of WLANs relates to the ability to maintain an IP-connection while roaming.

FIG. 1 is a block diagram of a conventional wireless local area network (WLAN). The WLAN 1 of FIG. 1 includes wireless clients 2, 4, a first subnet (A) 10, a wireless switch 12, access points (APs) 14, 16, a second subnet (B) 20, a wireless switch 22, access points (APs) 24, 26 and layer 3 routers 34, 36. The router 34 is coupled to the wireless switch 12. The wireless switch 12 supports the first subnet (A) 10 and is coupled to the access points (APs) 14, 16. The access points (APs) 14, 16 have IP addresses within the first subnet (A) 10. The router 36 is coupled to the wireless switch 22. The wireless switch 22 supports the second subnet (B) 20 and is coupled to the access points (APs) 24, 26. The access points (APs) 24, 26 have IP addresses within the second subnet (B) 20. The clients 2, 4 are wireless devices which physically move around the WLAN 1, and communicate with an IP network via the access points (APs) 14, 16 and access points (APs) 24, 26, respectively.

FIG. 1 illustrates the concept of layer 2 roaming and the concept of layer 3 roaming in the WLAN. A layer 2 network is defined as a single IP subnet and broadcast domain, such as the first subnet (A) 10, while a layer 3 network is defined as the combination of multiple IP subnets and broadcast domains, such as the first subnet (A) 10 and the second subnet (B) 20.

Layer 2 refers to the data link layer of the Open Systems Interconnection (OSI) communication model. The data link layer is concerned with moving data across the physical links in the network. In a network, the switch is a device that redirects data messages at the layer 2 level, using the destination Media Access Control (MAC) address to determine where to direct the message. In the context of the IEEE-802 LAN standards, the data link layer contains two sublayers called the Media Access Control (MAC) sublayer and the Logical Link Control (LLC) sublayer. The data link layer ensures that an initial connection has been set up, divides output data into data frames, and handles the acknowledgements from a receiver that the data arrived successfully. The data link layer also ensures that incoming data has been received successfully by analyzing bit patterns at special places in the frames.

Layer 2 roaming occurs when a client moves far enough away from its AP such that its radio associates with a different AP in the same subnet. The client disconnects from one Access Point (AP) and re-connects to another AP in the same subnet (broadcast domain) where several APs use the same Service Set Identifier (SSID). A client continuously listens to nearby APs and can decide to roam if it finds an AP with the same SSID and stronger signal or is experiencing too much loss with the current AP. To initiate a layer 2 roam, the client sends an associate (or reassociate) request to the new AP. It may disassociate from the old AP, or the old AP may notice the client is no longer there.

IEEE's 802.11f Inter Access Point Protocol (IAPP) addresses roaming between Access Points (APs) inside client's home subnet and assures constant IP-connectivity in this case. With layer 2 roaming, APs inside a given subnet share the same Extended Service Set (ESS), and although the physical point of attachment (the AP) changes, the client is still served by the same Access Router. Because the original and the new AP offer coverage for the same IP subnet, the device's IP address is still valid after the roam and can remain unchanged. For example, when the roams within the first subnet (A) 10, the IP address of the client will remain the same.

After the client successfully roams, LAN traffic for the client can be relayed through the new AP. However, because the scalability of subnets is limited by the number of APs and clients that can be supported within a given subnet, in some situations the client roams to a new AP in a different or foreign subnet supported by another wireless switch. Because the client cannot be identified by its original home IP address anymore, a new IP address is required for the routing the client's IP data. Consequently, any on-going connections can be disrupted and IP connectivity can be lost. For applications like wireless VoIP phones or streaming applications, this is not acceptable.

Layer 3 refers to the network layer of the Open Systems Interconnection (OSI) multilayered communication model. The network layer is concerned with knowing the address of the neighboring nodes in the network, selecting routes and quality of service, and recognizing and forwarding to the transport layer incoming messages for local host domains.

Layer 3 roaming occurs when a client moves from an AP within its home IP subnet, such as the first subnet (A) 10, to a new AP within a foreign IP subnet, such as the second subnet (B) 20. This foreign IP subnet has a different Basic Service Set (BSS) than the home IP subnet. The client disconnects from one AP and reconnects or re-associates with another foreign AP in a foreign IP subnet outside its home IP subnet. In this re-association, the client is supposed to be served by a different access router (through the foreign AP), which bares a different IP address, while the client itself preserves its original IP address. At that point, the client would no longer have an IP address and default gateway that are valid within the foreign IP subnet. Therefore, if no other protocol is implemented to address an L3 roam, the client will not able to send/receive IP packets from/to its current location. As a result, active IP sessions can be dropped because IP-connectivity is lost.

To prevent existing data sessions or voice calls from failing because the remote client can no longer reach the local client, processes called "IP handoff" or "L3 handover" can be used to preserve the IP traffic to/from the client after such re-association with the foreign AP. Because this process is not addressed by current IEEE nor Wi-Fi standards, important functions, such as preservation of the client's IP connectivity upon a layer 3 handover, have yet to be standardized.

Nevertheless, some vendors of WLANs have developed solutions which can allow layer 3 roaming to occur by providing mechanisms for a client to obtain a new IP address. For instance, if the client roams across a boundary between the first subnet (A) 10 and the second subnet (B) 20 and a Dynamic Host Configuration Protocol (DHCP) is enabled on the client, then the client can use DHCP to obtain a new IP address of the second subnet (B) 20.

However, layer 3 traffic re-routing requires more than updating MAC address tables and ARP caches. Many applications require persistent connections and drop their sessions as a result of inter-subnet roaming. Network layer devices such as routers and layer 3 switches must somehow be told to forward IP packets to the client's new subnet. To provide session persistence, mechanisms are need to allow a client to maintain the same Layer 3 address while roaming throughout a multi-subnet network. Otherwise, many applications will timeout trying to reach the client's old IP and must be reconnect with the client's new IP.

One way to support layer 3 roaming in WLANs is via an open IETF standard called Mobile IP. Mobile IP provides one solution for handling the L3 movements of clients regardless of the underlying layer 2 technology.

In the context of Mobile IP, the client is referred to as a mobile node (MN). In the description that follows, these terms are used interchangeably. Mobile IP uses a Home Agent (HA) to forward IP packets to a Foreign Agent (FA) in the client's new subnet. The HA and FA advertise themselves using the ICMP Router Discovery Protocol (IRDP). The Foreign Agent periodically advertises its presence wirelessly and waits for a solicitation message from a roaming mobile node. When a Mobile IP-enabled client roams to a new subnet, it must discover and register itself with a nearby FA. The registration process for such a node is triggered by a wireless registration request (after the 802.11 association is completed) issued by the MN. The FA forwards that request to that client's original HA. Wired messages can then be exchanged between the HA and the FA as well as with binding table updates. An acknowledgment can then be sent wirelessly to the MN.

If the request is accepted, a tunnel is established between the HA and FA to relay incoming packets sent to the client's original IP address. The HA serves as the anchor point for communication with the wireless client. It tunnels packets from Corresponding Nodes towards the current address of the MN and vise versa. Outbound packets are routed back through the tunnel from the FA to HA, and then on to their destination.

Although Mobile IP preserves subnet connectivity for roaming clients, it can result in sub-optimal routing and longer roaming delay. As noted above, the wireless client must first regain over the air connectivity with its new FA before the Agent Discovery Phase is launched. This can result in considerable reconnection time which increases latency. Furthermore, the registration process involves wire line and wireless communication. The amount of packet loss and the significant delay introduced during these procedures make the method unsuitable for many WLAN application, such as VoIP over 802.11 or streaming over 802.11.

Notwithstanding these advances, as new applications emerge and are implemented, such as VoIP over 802.11, changes to the WLAN deployment are required. For example, coverage-oriented deployments must move to capacity-oriented deployments characterized by low user to AP ratio and more APs in a given coverage area. The move to capacity-oriented deployments emphasizes the need for techniques that allow clients to roam across subnets and roaming domains.

There is a need for layer 3 roaming techniques which can allow a client to roam across different IP subnets of a WLAN while preserving the client's original IP-connection and original IP address. It would be desirable if such techniques could allow the client to perform a seamless and smooth L3 handoff between APs of different IP subnets, while maintaining an active session without losing IP connectivity. It would be desirable if such techniques could enable routing of IP data to/from the client's current foreign subnet to their original IP address and home subnet even though the client is currently in a foreign subnet. It would also be desirable to provide layer 3 roaming techniques which can eliminate the need to re-key during re-authentication. Other desirable features and characteristics of the present invention will become apparent from the subsequent detailed description and the appended claims, taken in conjunction with the accompanying drawings and the foregoing technical field and background.

SUMMARY OF THE INVENTION

Techniques are provided for creating an active client list that can be distributed to a plurality of wireless switches. The wireless switches are located in a wireless local area network comprising a registration server, a plurality of active clients, and the plurality of wireless switches. Registration information associated with each of the active clients is communicated to the wireless switches that support those active clients. The registration information associated with each of the active clients from the wireless switches is communicated over an IP tunnel to the registration server. An active client list can then be created using the registration information for each active client. The active client list comprises a record for each active client in the wireless local area network. The record of each client comprises a MAC address of the client, a client IP address of the client, a home switch of the client, a visited switch of the client, inactivity timers for the home switch and the visited switch and location information. The active client list and the registration information for each active client can be communicated to each wireless switch. Registration information updates are communicated from each wireless switch to the registration server. The registration server can use the registration information updates received from the wireless switches to update the active client list. The registration information updates are communicated to each of the other wireless switches in the wireless local area network. Alternatively, the registration server can communicate an updated active client list including the registration information updates to the active client list to each wireless switch.

A wireless local area network is provided comprising a plurality of active clients, a plurality of wireless switches, and a registration server. Each of the active clients communicates registration information to the wireless switch that supports the active client. The registration server can be coupled to each of the wireless switches via an IP socket. The registration server receives registration information for each of the active clients from each of the wireless switches, and creates an active client list using the registration information for each active client. The active client list comprises a record for each active client in the wireless local area network. In one implementation, the record of each client comprises a MAC address of the client, a client IP address of the client, a home switch of the client, a visited switch of the client, inactivity timers for the home switch and the visited switch and location information.

In one implementation, each of the wireless switches can comprise ports, a transceiver having a transmitter subsystem and a receiver subsystem, a processor and a database. The receiver can receive registration information from each of the active clients the wireless switch supports. The port couples the wireless switch to the registration server via an IP socket. The transmitter transmits the registration information to the registration server. The receiver can receive the active client list from the registration server, wherein the active client list comprises a record for each of the active clients in the wireless local area network. The receiver can also receive registration information updates from each of the active clients the wireless switch supports, and the transmitter can send the registration information updates to the registration server. The transmitter can also send the registration information updates to each of the other wireless switches in the wireless local area network. The receiver can receive an updated active client list from the registration server which includes the registration information updates received from each of the wireless switches.

In one implementation, the registration server can include ports, a transceiver having a transmitter subsystem and a receiver subsystem, a processor and a database. Each port couples the registration server one of the wireless switches via an IP socket. The receiver can receive registration information for each active client from the wireless switch that supports each active client. The processor can create an active client list using the registration information for each active client. The database can store the active client list and registration information for each active client, and the transmitter can communicate the active client list and registration information for each active client to each wireless switch. In one implementation, the wireless switches send registration information updates. The receiver can receive registration information updates from the wireless switches, and the processor can use the registration information updates to create an updated active client list. The transmitter can then send the registration information updates to each of the wireless switches. In another implementation, the wireless switches send registration information updates to the receiver, and the processor can use. the registration information updates to update the active client list. The transmitter can send the registration information updates to the active client list to each wireless switch as the registration information updates are received from the wireless switches.

BRIEF DESCRIPTION OF THE DRAWINGS

The present invention will be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Embodiments of the present invention provide methods and apparatus that allow for a client to roam from a first subnet to a second subnet while keeping the same IP address used in the home subnet. As used herein, a "client" is a mobile device in a WLAN. The term "mobile device" can generally refer to a wireless communication device or other hardware with which an access network communicates. At an given time a mobile device may be mobile or stationary and can include devices that communicate through a wireless channel or through a wired channel. A mobile device may further be any of a number of types of mobile computing devices including but not limited to a laptop computer, a PC card, compact flash, external or internal modem, wireless or wireline phone, personal digital assistant (PDA) or mobile telephone handset.

Figure 1:
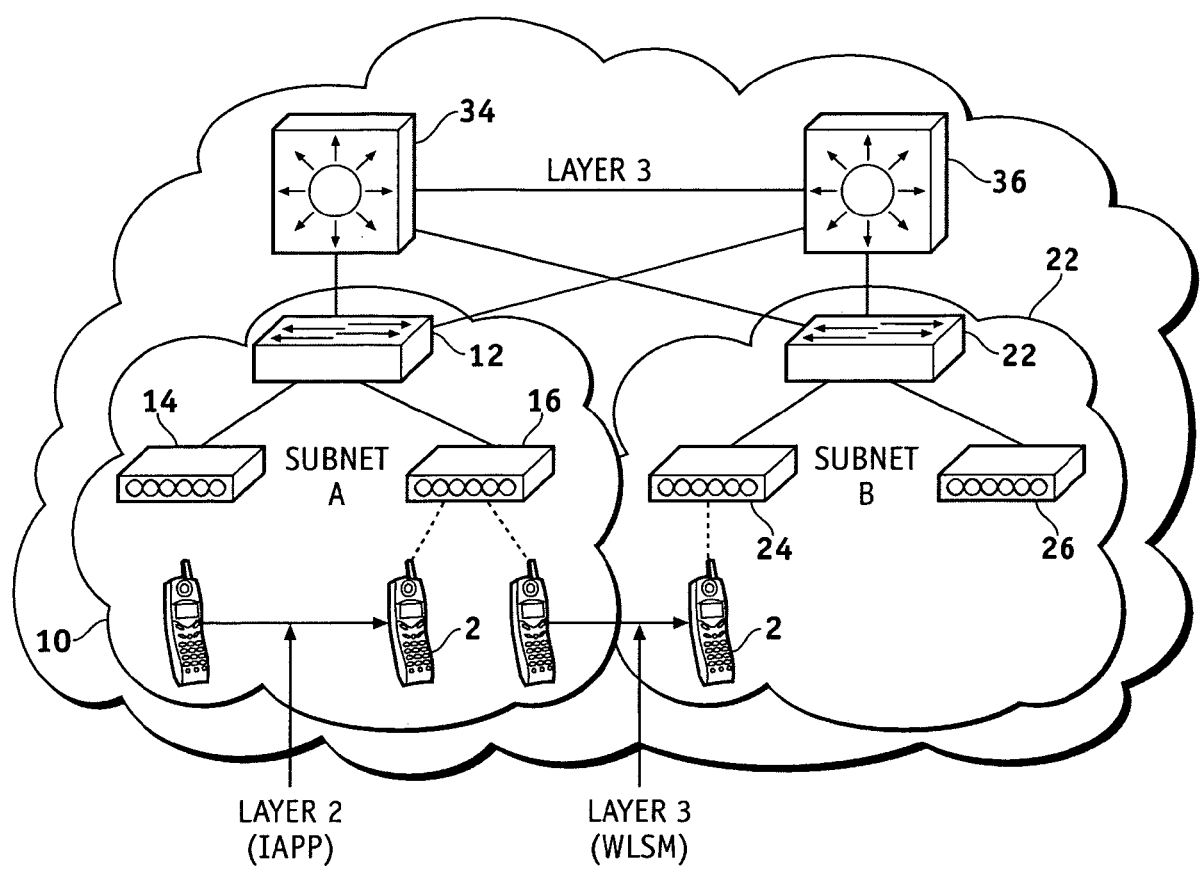
FIG. 1 is a block diagram of a conventional wireless local area network (WLAN) which illustrates the concept of layer 2 roaming and the concept of layer 3 roaming in the WLAN.
Figure 2:
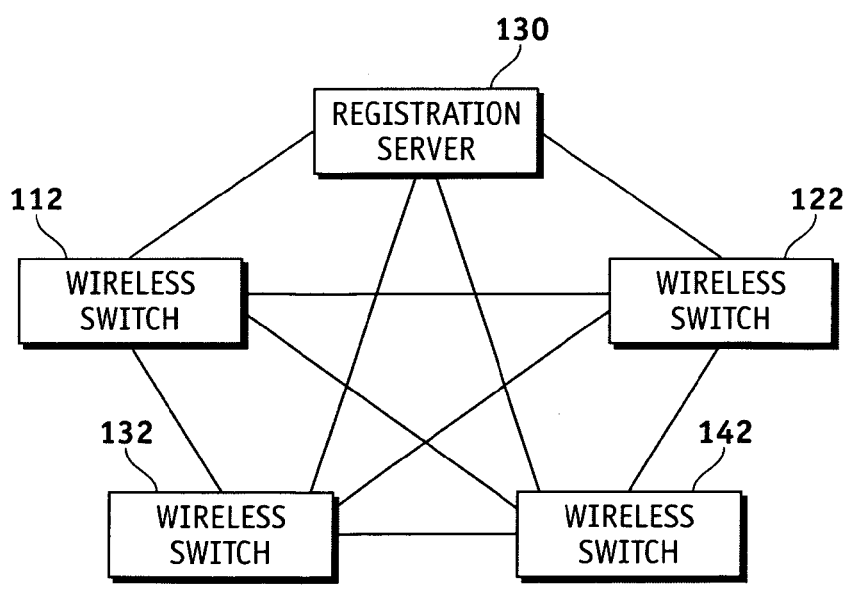
FIG. 2 is a block diagram of a WLAN according to one exemplary embodiment which implements a registration server and a plurality of wireless switches.

FIG. 2 is a block diagram of a WLAN according to one exemplary embodiment which implements a registration server 130 and wireless switches 112, 122, 132, 142. As used herein, the term "WLAN" refers to a network in which a mobile user can connect to a local area network (LAN) through a wireless (radio) connection. The IEEE 802.11 standard specifies some features of exemplary wireless LANs.

As used herein, the term "packet" refers to a unit of data that is routed between an origin and a destination on a packet-switched network such as the Internet. When any file is sent from one place to another on the Internet, the Transmission Control Protocol (TCP) layer divides the file into "chunks" of an efficient size for routing. Each of these packets is separately numbered and includes the Internet address of the destination. The individual packets for a given file may travel different routes through the Internet. When they have all arrived, they are reassembled into the original file by the TCP layer at the receiving end. In the context of the User Datagram Protocol (UDP), it should be appreciated that the term "datagram" has a similar meaning to the term "packet."

As used herein, the term "switch" refers to a device that channels incoming data from any of multiple input ports to the specific output port that will take the data toward its intended destination. A switch typically performs the data-link or layer 2 function and determines, from an IP address in each packet, which output port to use for the next part of its trip to the intended destination. The destination address generally requires a look-up in a routing table by a device known as a router. In some embodiments, the switch can function as an IP switch which may also perform network or layer 3 routing functions.

The registration server 130 and wireless switches 112, 122, 132, 142 can be coupled to each other via IP sockets or tunnels which the wireless switches 112, 122, 132, 142 create to the registration server 130. The wireless switches 112, 122, 132, 142 are coupled to each other by a mesh network of IP sockets or tunnels. As used herein, the term "tunneling" refers to the process of allowing two disparate networks to connect directly to one another when they normally would not or when they are physically disjointed. Tunneling is synonymous with encapsulation, and is generally done by encapsulating private network data and protocol information within public network transmission units so that the private network protocol information appears to the public network as data. A tunnel requires an entry point and an exit point. The entry point encapsulates the tunneled packets within another IP header. The new IP header might include some other parameters, but the basic function of the encapsulation header is to direct the packet to the tunnel endpoint. A packet received by the tunnel endpoint is stripped of the encapsulation header and forwarded to the client.

The registration server 130 is a network entity that can be implemented as dedicated hardware on an external high availability platform. For example, the registration server 130 might be implemented in a blade server. Alternatively, the registration server 130 can be implemented as a module hosted on two wireless switches.

The registration server 130 is used for registering wireless switches in the WLAN when the wireless switches join the WLAN. The registration server 130 has a first Internet Protocol (IP) address which is configured on every wireless switch in the WLAN. As used herein, the term "Internet Protocol (IP) address" refers to a layer 3 address. Each communication from a user on the Internet carries an IP address of the source and destination networks and the particular machine within the network associated with the user or host computer at each end. In one implementation, the IP address is a 32-bit address comprising one part identifies the network with a network number and another part which identifies the specific machine or host within the network with a host number. Some of the bits in the machine or host part of the address can be used to identify a specific subnet. In this case, the IP address then contains three parts: the network number, the subnet number, and the machine number.

Each of the wireless switches 112, 122, 132, 142 has configuration information associated with it which can include, for example, an IP address and a list of subnets (IP domains) which the particular wireless switch supports. As used herein, the term sub-network or "subnet" refers to an identifiably separate part of a network. Typically, a subnet may represent all the machines at one geographic location, in one building, or on the same wireless local area network (WLAN). One standard procedure for creating and identifying subnets is described in Internet Request for Comments (RFC) 950.

Each of the wireless switches 112, 122, 132, 142 registers with the registration server 130 by communicating its configuration information to the registration server 130 and uses the IP address of the registration server 130 to create or open a first IP socket (tunnel) to the registration server 130. The wireless switches 112, 122, 132, 142 can periodically send update messages to each other. These update messages can include, for example, changes to the configuration information associated with each wireless switch.

The registration server 130 can use the configuration information to create an AWSL which includes a listing of each of the wireless switches 112, 122, 132, 142 in the WLAN. The registration server 130 sends the AWSL to each of the wireless switches 112, 122, 132, 142. Each of the wireless switches 112, 122, 132, 142 uses the AWSL to open a UDP/IP socket to each of the other wireless switches 112, 122, 132, 142. Once all of the wireless switches 112, 122, 132, 142 are coupled together via UDP/IP sockets and are coupled to the registration server 130 via IP sockets, the mesh network is complete. This mesh network changes dynamically as new switches are added (e.g., register with the registration server 130) or removed from the WLAN.

In one implementation, each of the wireless switches 112, 122, 132, 142 can send configuration information to each of the other wireless switches 112, 122, 132, 142. Alternatively, the registration server 130 can send the configuration information for each of the wireless switches 112, 122, 132, 142 to each of the other wireless switches 112, 122, 132, 142.

The wireless switches 112, 122, 132, 142 can also periodically send update messages to each other. If a certain amount of time passes and one of the wireless switches do not send update messages, then the other wireless switches can assume that wireless switch is no longer in the WLAN.

Typically, any communications between the registration sever 130 and the wireless switches 112, 122, 132, 142 over the IP sockets are unencrypted. However, in another embodiment, if security is a concern, the IP sockets (tunnels) can go over a security protocol, such as Internet Protocol Security (IPSec), and the communications can be encrypted using IPSec. "Internet Protocol Security (IPSec)" refers to a framework for a set of security protocols at the network or packet processing layer of network communication. IPsec can allow security arrangements to be handled without requiring changes to individual user computers. IPsec provides two choices of security service: Authentication Header (AH), which essentially allows authentication of the sender of data, and Encapsulating Security Payload (ESP), which supports both authentication of the sender and encryption of data as well. The specific information associated with each of these services is inserted into the packet in a header that follows the IP packet header. Separate key protocols can be selected, such as the ISAKMP/Oakley protocol. As will be described below, the client 202 can use IPSec terminated on the home wireless switch 212.

In another embodiment, it may be desirable to deploy redundant registration servers. When multiple registration servers 130 are implemented the configuration of the active or master registration server 130 can be synchronized with the configuration of a standby or slave registration server. That way, in the event the active or master registration server 130 fails, the standby or slave registration server can take over since it includes the same information (e.g., wireless switch list, active client list) as the active or master registration server 130.

In addition to the functionality related to the L3 roaming in WLANs, other functionality can be implemented in the registration server 130 that is typically implemented in other external servers. For example, the registration server 130 can host wireless intrusion detection system (WIDS) functionality, location server functionality, billing functionality, etc.

Because the registration server 130 has information about each wireless switch (e.g., wireless switch list) and each client (e.g., active client list) in the WLAN, the registration server 130 can leverage this information with other functions provided by the additional functionality.

Figure 3:
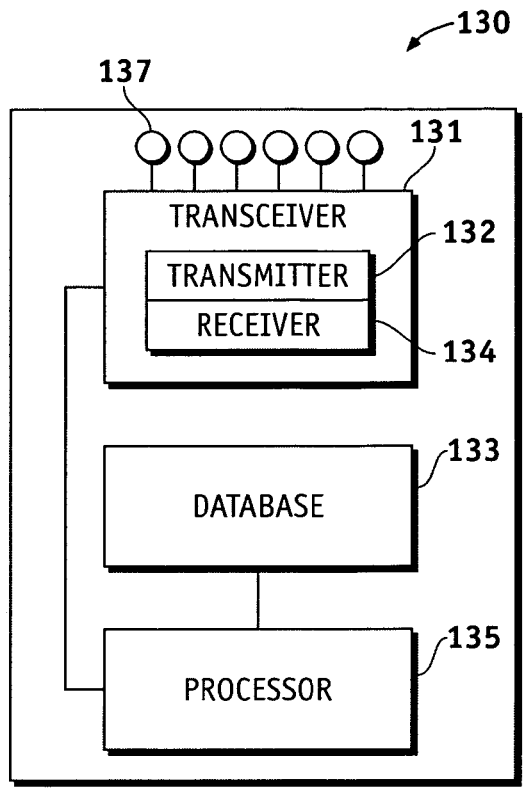
FIG. 3 is a block diagram of a registration server according to one exemplary embodiment.

FIG. 3 is a block diagram of a registration server 130 according to one exemplary embodiment. The registration server 130 can include, for example, a transceiver 131 which includes a transmitter 132 and a receiver 134, a database 133, a processor 135 and a number of ports 137.

The receiver 134 of the registration server 130 can communicate the IP address of the registration server 130 to each of the wireless switches. Each of the wireless switches can use the IP address to open an IP socket to one of the ports. The receiver 134 receives configuration information from each wireless switch that includes attributes and parameters associated with each of the wireless switches 112, 122, 132, 142. This configuration information is communicated over a set of first IP sockets or tunnels between each of the wireless switches 112, 122, 132, 142 and the registration server 130. The configuration information for each wireless switch 112, 122, 132, 142 comprises a switch IP address and a list of subnets (IP domains) which the wireless switch supports. The processor 135 registers each of the wireless switches 112, 122, 132, 142 with the registration server 130 using the configuration information received from the wireless switches 112, 122, 132, 142 during registration and, optionally, updates received from the wireless switches 112, 122, 132, 142. The processor 135 can use the configuration information communicated received from the wireless switches 112, 122, 132, 142 to create an active wireless switch list (AWSL). The AWSL includes a listing of each of the wireless the switches in the WLAN. The transmitter 132 subsystem can communicate the configuration information for each of the wireless switches and the AWSL to each of the wireless switches. Each of the wireless switches can use the configuration information and the AWSL to open a UDP/IP socket to each of the other wireless switches. The database 135 can store the configuration information for each of the plurality of wireless switches and the AWSL.

Figure 4:
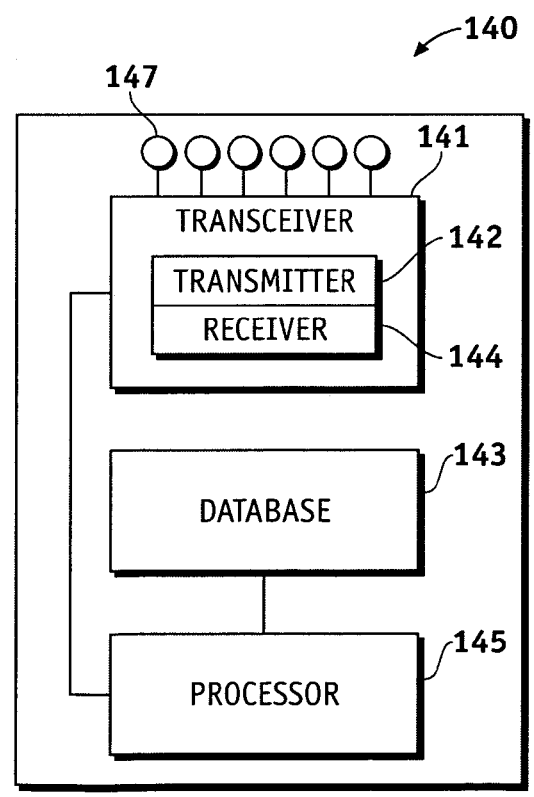
FIG. 4 is a block diagram of a wireless switch according to one exemplary embodiment.

FIG. 4 is a block diagram of a wireless switch 140 according to one exemplary embodiment. The wireless switch 140 could be implemented as any or all of the wireless switches 112, 122, 132, 142 described above. The wireless switch 140 can include, for example, a transceiver 141 which includes a transmitter 142 and a receiver 144, a database 143, a processor 145 and a number of ports 147.

The transmitter 142 can communicate configuration information about the wireless switch 140 to a registration server over an IP socket to the registration server 130. The transmitter 142 can also send configuration information for the wireless switch 140 to each of the other wireless switches.

The receiver 144 can receive configuration information for each of the other wireless switches and a copy of the AWSL which includes a listing of each of the other wireless switches in the WLAN.

The processor 145 can use the configuration information and the AWSL to open a UDP/IP sockets from the ports 147 to each of the other wireless switches.

The transmitter 142 can send the update messages for the wireless switch to each of the other wireless switches. The receiver 144 can also receive update messages from each of the other wireless switches. These update messages comprise changes to configuration information for each of the other wireless switches.

Figure 5:
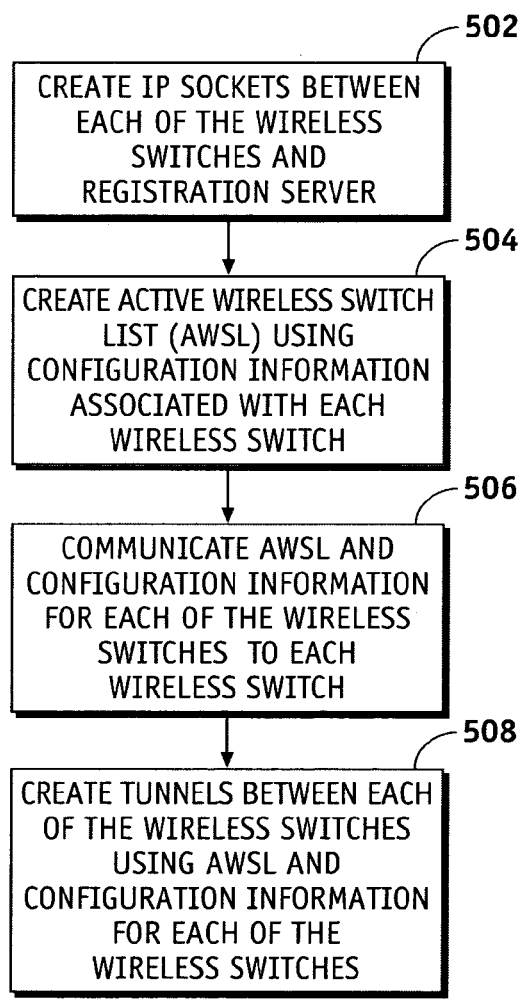
FIG. 5 is a flow chart showing an exemplary method creating a mesh network of wireless switches according to one exemplary embodiment.

FIG. 5 is a flow chart showing an exemplary method creating a mesh network of wireless switches in a WLAN comprising a wireless switches 112, 122, 132, 142 and a registration server 130. An IP address of the registration server 130 can be configured on each of the wireless switches 112, 122, 132, 142.

At step 502, the IP address of the registration server 130 can be used to create or open an IP socket from each of the wireless switches 112, 122, 132, 142 to the registration server 130. Each of the wireless switches 112, 122, 132, 142 can register with the registration server 130 by communicating configuration information about each of the wireless switches 112, 122, 132, 142 to the registration server 130. In one implementation, the configuration information for each switch 112, 122, 132, 142 comprises a switch IP address and a list of subnets the switch supports.

At step 504, the registration server 130 can use the configuration information to create an active wireless switch list (AWSL) which includes a listing of each of the wireless switches 112, 122, 132, 142 in the WLAN.

At step 506, the AWSL and the configuration information for each of the wireless switches 112, 122, 132, 142 can then be communicated to each of the wireless switches 112, 122, 132, 142.

At step 508, each of the wireless switches 112, 122, 132, 142 can use the configuration information and the AWSL to open a UDP/IP socket to each of the other wireless switches 112, 122, 132, 142. Each wireless switch is then connected to each of the other wireless switches 112, 122, 132, 142 and a mesh network of wireless switches 112, 122, 132, 142 is created.

In other implementations, each of the wireless switches 112, 122, 132, 142 can send configuration information to each of the other wireless switches 112, 122, 132, 142. Alternatively, the registration server 130 can send the configuration information and the AWSL for each of the wireless switches 112, 122, 132, 142 to each of the other wireless switches 112, 122, 132, 142. Each wireless switch 112, 122, 132, 142 can also send update messages to each of the other wireless switches 112, 122, 132, 142. These update messages can include, for example, changes to configuration information for each wireless switch 112, 122, 132, 142.

Figure 6:
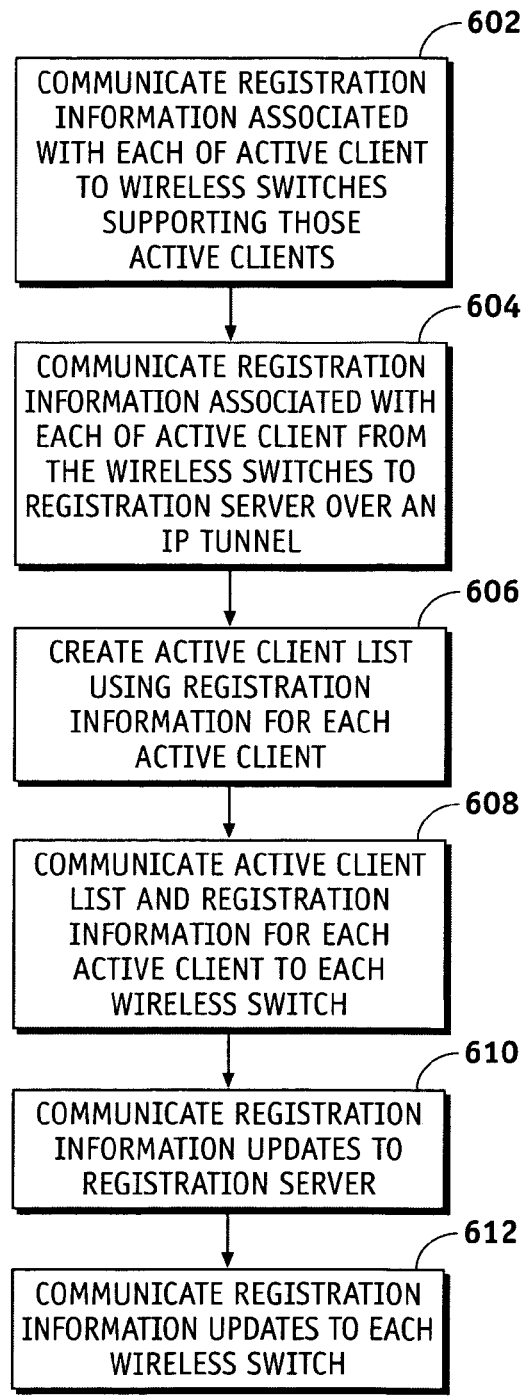
FIG. 6 is a flow chart showing an exemplary method for providing an active client list to a plurality of wireless switches according to one exemplary embodiment.

FIG. 6 is a flow chart showing an exemplary method for providing an active client list (ACL) to a plurality of wireless switches 112, 122, 132, 142 according to one exemplary embodiment. The wireless switches 112, 122, 132, 142 can be located, for instance, in a WLAN such as the WLAN of FIG. 2 comprising a registration server 130 and a plurality of active clients (not shown) supported by the wireless switches 112, 122, 132, 142.

At step 602, registration information associated with each of the active clients is communicated to the wireless switches 112, 122, 132, 142 that support those active clients. At step 604, the registration information associated with each of the active clients is communicated from the wireless switches 112, 122, 132, 142, over an IP tunnel, to the registration server 130. At step 606, an active client list can be created using the registration information for each active client. The active client list comprises a record for each active client in the WLAN. The record of each client comprises a MAC address of the client, a client IP address of the client, a home switch of the client, a visited switch of the client, inactivity timers for the home switch and the visited switch and location information. At step 608, the active client list and the registration information for each active client is communicated to each wireless switch 112, 122, 132, 142. At step 610, registration information updates are communicated from each wireless switch 112, 122, 132, 142 to the registration server 130. The registration server 130 can use the registration information updates received from the wireless switches 112, 122, 132, 142 to update the active client list. At step 612, the registration information updates are communicated to each of the other wireless switches 112, 122, 132, 142 in the WLAN. Alternatively, the registration server 130 can communicate an updated active client list including the registration information updates to the active client list to each wireless switch 112, 122, 132, 142.

Referring again to FIG. 3, the registration server 130 can include ports 137, a transceiver 131 comprising a transmitter 132 and a receiver 134, a processor 135, a database 133. Selected ports couple the registration server 130 to the wireless switches 112, 122, 132, 142 via IP sockets. The receiver 134 can receive registration information for each active client from the wireless switch that supports each active client. The processor 135 can create an ACL using the registration information for each active client. The database 135 can store the ACL and registration information for each active client, and the transmitter 132 can communicate the ACL and registration information for each active client to each wireless switch. In one implementation, the wireless switches send registration information updates. The receiver 134 can receive registration information updates from the wireless switches, and the processor 135 can use the registration information updates to create an updated ACL. The transmitter 132 can then send the registration information updates to each of the wireless switches. In another implementation, the wireless switches send registration information updates to the receiver 134, and the processor 135 can use the registration information updates to update the ACL. The transmitter 132 can send the registration information updates to the ACL to each wireless switch 112, 122, 132, 142 as the registration information updates are received from the wireless switches 112, 122, 132, 142.

Referring again to FIG. 4, each of the wireless switches 112, 122, 132, 142 can include, for example, a number of ports 147, a transceiver 141 including a transmitter 142 and a receiver 144, a processor 145 and a database 143. The receiver 144 can receive registration information from each of the active clients the wireless switch supports. The ports 247 couple the wireless switches 112, 122, 132, 142 to the registration server 130 via IP sockets. The transmitter 142 transmits the registration information to the registration server 130. The receiver 144 can receive the ACL from the registration server 130. The ACL comprises a record for each of the active clients in the WLAN. The receiver 144 can also receive registration information updates from each of the active clients the wireless switch supports, and the transmitter 142 can send the registration information updates to the registration server 130. The transmitter 142 can also send the registration information updates to each of the other wireless switches in the WLAN. The receiver 144 can receive an updated ACL from the registration server 130 which includes the registration information updates received from each of the wireless switches.

If a client moves away from its home switch, the home switch needs a way to determine that it no longer needs to support that client. Otherwise, the client would tunnel to their home switch indefinitely regardless of the client's location. Techniques are needed to allow the home switch to determine that it is no longer the best switch for that particular client. In another embodiment, the registration server 230 or the switches can monitor the inactivity timers. If the inactivity timers of the client 202 indicate that the client 202 is inactive on its home switch (and the visited switch) for a given period of time, then the registration server 230 forces the client 202 to reauthenticate, reassociate and get a new client IP address on a new wireless switch. This allows the WLAN to avoid transmitting unnecessary overhead and cleans up unnecessary traffic in the tunnels between switches.

Figure 7:
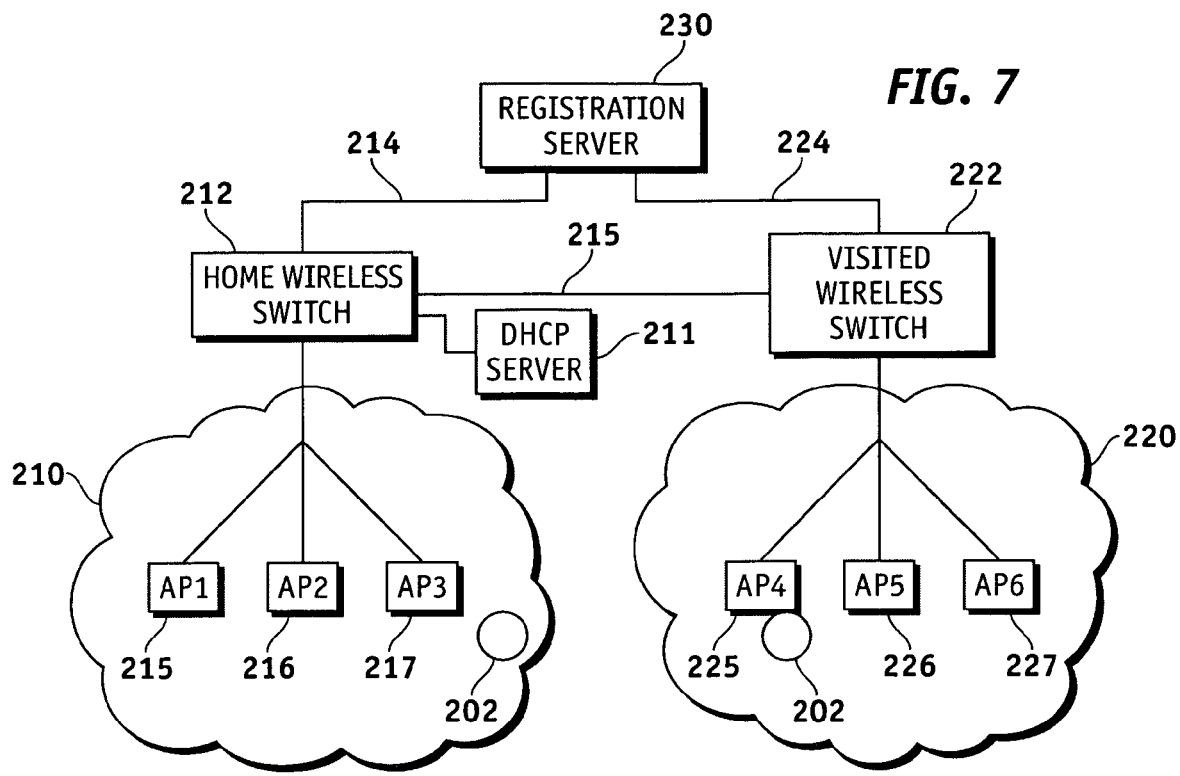
FIG. 7 is a block diagram of a WLAN according to one exemplary embodiment which implements a registration server and a home wireless switch supporting a first subnet and a visited wireless switch supporting a second subnet.

FIG. 7 is a block diagram of a WLAN according to one exemplary embodiment which implements a registration server 230 and a home wireless switch 212 supporting a first subnet 210 and a visited wireless switch 222 supporting a second subnet 220. Although FIG. 7 shows two wireless switches 212, 222 and two subnets 210, 220, it should be appreciated that more than two switches and subnets can be implemented in the WLAN. It should also be appreciated that while FIG. 7 shows a single client 202, more than one client is typically present in the WLAN. Typically, in a given WLAN there are a number of active clients. In this example, the first subnet 210 would typically support a group of the active clients having client IP addresses within the first subnet 210, and the second subnet 220 would typically supports another group of the active clients having client IP addresses within the second subnet 220. In addition, in FIG. 7, each subnet 210, 220 is shown as comprising three access points (APs) 215-217 and 225-227, however, any number of APs could be implemented within a subnet.

As used herein, the terms "access point (AP)" or "access port (AP)" refer to a station that transmits and receives data (sometimes referred to as a transceiver). An access point connects users to other users within the network and also can serve as the point of interconnection between the WLAN and a fixed wire network. Each access point can serve multiple users within a defined network area. As a client moves beyond the range of one access point, the client can be automatically handed over to the next AP. A WLAN may only require a single access point. The number of APs in a given subnet generally increases with the number of network users and the physical size of the network.

The home wireless switch 212 supports a first VLAN comprising a first subnet 210 which includes access points (AP1) 215, (AP2) 216, and (AP3) 217. All clients on the first VLAN have IP addresses in the first subnet 210. Tunnels couple the access points (AP1) 215, (AP2) 216, and (AP3) 217 to the home wireless switch 212. The home wireless switch 212 has first configuration information comprising a first IP address and a list of first subnets (IP domains) supported by the home wireless switch 212. The home wireless switch 212 registers with the registration server 230 by communicating the first configuration information to the registration server 230 over the first IP socket 214. The client 202 is initially associated with first subnet 210 communicating with the home wireless switch 212 through the AP3 217. The client 202 has a client IP address from within the first subnet 210. The client 202 eventually roams into the second subnet 220 where it communicates with the visited virtual wireless switch 222 through the access port (AP4) 225.

Similarly, the visited wireless switch 222 supports a second VLAN comprising a second subnet 220 which includes access points (AP4) 225, (AP5) 226, and (AP6) 227. All clients on the second VLAN have IP addresses in the second subnet 220. Tunnels couple the access points (AP4) 225, (AP5) 226, and (AP6) 227 to the visited wireless switch 222. The visited wireless switch 222 has second configuration information comprising a second IP address and a list of second subnets (IP domains) supported by the visited wireless switch 222. The visited wireless switch 222 registers with the registration server 230 by communicating the second configuration information to the registration server 230 over the second IP socket 224.

Because the IP address of the registration server is configured on each of the wireless switches, each of the wireless switches can use the IP address during registration to open an IP socket to the registration server. In this example, a first IP socket 214 can be provided which couples the home wireless switch 212 and the registration server 230, and a second IP socket 224 between the visited wireless switch 222 and the registration server 230.

A database 137 in the registration server 230 stores the associated configuration information for each of the plurality of wireless switches.

Each of the wireless switches also communicates registration information for each active client to the registration server 230. The registration server 230 can use the registration information to create an active client list (ACL). The active client list comprises a record for each active client 202 in the WLAN. The record of each client 202 comprises a number of attributes, for instance, a MAC address of the client, a client IP address of the client, a home switch of the client, a visited switch of the client, inactivity timers for the home switch and the visited switch and location information. The registration server 230 can send a copy of the active client list (or a portion of the active client list) to each wireless switch in the WLAN.

In one embodiment, the registered wireless switches can periodically send updates regarding registration information for each active client to the registration server 230. The registration server 230 can use these updates to create an updated active client list. Whenever the registration server 230 receives updated registration information (or new registration information from a new switch joining the network), the registration server 230 can then send the updates of the active client list to each wireless switch as the updates are received from the wireless switches.

As will be described below, when the client roams from its original home subnet to a visited subnet supported by a visited wireless switch, the active client list can be used by each of the wireless switches to allow a client to keep its original TCP/IP or UDP/IP connection and its original client IP address assigned by its home wireless switch.

The active client list includes a record for the client 202 which is based on the first configuration information. This record of comprises a MAC address of the client 202, the client IP address of the client, the home wireless switch 212 of the client, the visited wireless switch 222 of the client 202, inactivity timers for the home wireless switch 212 and the visited wireless switch 222. This record can be periodically updated using updates received from the wireless switch. A database 133 in the registration server 230 can store the first configuration information, second configuration information, and the active client list.

Because the home wireless switch 212 and the visited wireless switch 222 are registered on the registration server 230, a UDP/IP tunnel 215 can be created which couples the home wireless switch 212 and the visited wireless switch 222. Each of the wireless switches can use configuration information from the wireless switch list to open a UDP/IP tunnel or socket to the other wireless switch. As will be explained in greater detail below, this tunnel allows the client 202 to maintain the client's IP address from its home wireless switch 212 when the client 202 roams from the home wireless switch 212 and the visited wireless switch 222.

A protocol can be implemented which allows a DHCP server 211 to assign the original client IP address to the client even when the client 202 roams from the home wireless switch 212 to the visited wireless switch 222. As used herein, the "Dynamic Host Configuration Protocol (DHCP)" refers to a protocol for assigning dynamic IP addresses to devices on a network. DHCP typically sends a new IP address when a computer is plugged into a different place in the network. This protocol allows a device to have a different IP address every time it connects to the network, and the device's IP address can even change while it is still connected. DHCP can also support a mix of static and dynamic IP addresses. DHCP uses the concept of a "lease" or amount of time that a given IP address will be valid for a computer. Using very short leases, DHCP can dynamically reconfigure networks in which there are more computers than there are available IP addresses.

When the client 202 begins to roam to the visited wireless switch 222, as the client 202 approaches the visited wireless switch 222, the client 202 hears a new beacon sent out by an access port (AP) 225 connected to the visited wireless switch 222. The new beacon has a new BSSID (MAC address) different from the one used by access port (AP3) 217 connected to the home wireless switch 212. As such, the client 202 802.11 authenticates with the visited wireless switch 222, 802.11 associates with the visited wireless switch 222, 802.1x authenticates with the visited wireless switch 222 and issues a Dynamic Host Configuration Protocol (DHCP) request. Once the client 202 802.11 authenticates and 802.11 associates with the visited wireless switch 222, the client 202 can continue its existing TCP/IP connection.

To allow for layer 3 roaming between the home wireless switch 212 and the visited wireless switch 222, it would be desirable to send a Dynamic Host Configuration Protocol (DHCP) request to the client's home wireless switch 212 since this can allow the client 202 to keep its original client IP address. Because the ACL is sent to each wireless switch, each switch has information about all active clients in the network. The visited wireless switch 222 can obtain the client IP address from the registration information that was sent to the registration server 230 when the home wireless switch 212 registered with the registration server 230. For example, the visited wireless switch 222 can search the record of the client 202 to get the MAC address of the client 202. The visited wireless switch 222 can use the MAC address of the client 202 to determine that the client IP address belongs to the first subnet 210 and that the client 202 was originally associated with the home wireless switch 212. Thus, the visited wireless switch 222 knows that the client 202 was initially associated with the home wireless switch 212 and that it had a client IP address belonging to the first subnet 210.

The visited wireless switch 222 can then relays the DHCP request to the home wireless switch 212 through the tunnel 215, and the home wireless switch 212 passes the DHCP request to the DHCP server 211. The DHCP server 211 reassigns the same original client IP address to the client 202. Because the client 202 maintains its original client IP address from the home switch, the client 202 does not need to re-establish its connection. This can prevent the session from dropping. The home wireless switch 212 forwards a Dynamic Host Configuration Protocol (DHCP) response to the visited wireless switch 222 and the client 202.

When the client 202 sends IP packets to the network, the IP packets will go to the visited wireless switch 222. The visited wireless switch 222 can then forward any IP packets it receives through the tunnel 215 to the home wireless switch 212 which can forward the IP packets to a router. Likewise, for outbound packets destined to the client IP address, the home wireless switch 212 can forward the outbound IP packets it receives to the client 202 through the visited wireless switch 222.

In one embodiment, if the client 202 comprises a WPA2 client, then the WPA2 client 202 is pre-authenticated with the visited wireless switch 222 to achieve layer 3 mobility with low latency. If the client uses IPSec, terminated on the home switch and no 802.11 encryptions, then the client could 802.11 re-authenticate and search the ACL to get the home wireless switch 212 from client's MAC address. This can allow all packets from the client 202 to be forwarded to the home wireless switch 212. Otherwise the client will 802.11 re-authenticate, go through dot1.x authentication, four way and two handshake to generate new transient keys and then continue with existing TCP or UDP sessions. The dot1.x authentication involves a RADIUS server and the latency can depend on type of the inter-authentication method (PEAP, TTLS, TLS).

Figure 8:
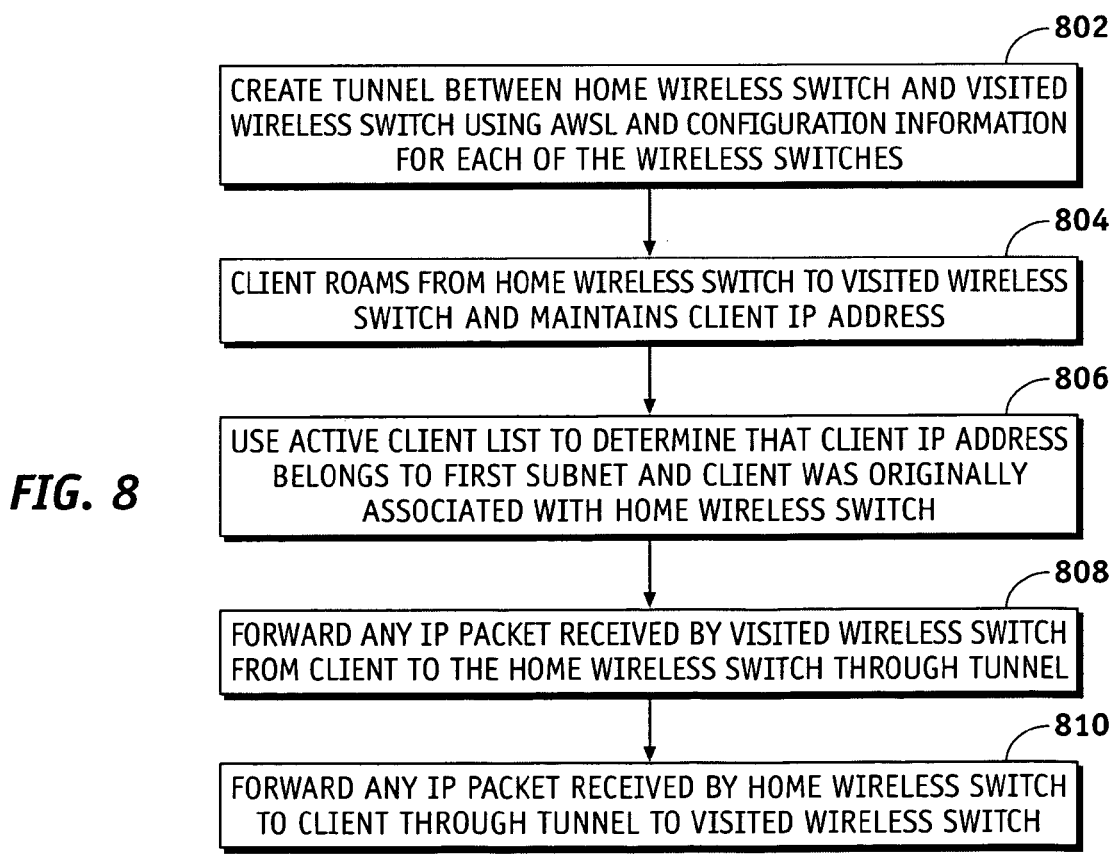
FIG. 8 is a flow chart showing an exemplary method for allowing a client, initially associated with a home wireless switch and having a client IP address from within a first subnet, to roam from the home wireless switch to a visited wireless switch configured to support a second subnet according to one exemplary embodiment.

FIG. 8 is a flow chart showing an exemplary method for allowing a client 202, initially associated with a home wireless switch 212 and having a client IP address from within a first subnet 210, to roam from the home wireless switch 212 to a visited wireless switch 222 configured to support a second subnet 220 according to one exemplary embodiment. This method can be used, for example, in a WLAN to allow a client 202 to keep its client IP address and maintain IP connectivity while roaming between the first subnet 210 and the second subnet 220.

At step 802, a tunnel is created or opened between the home wireless switch 212 to the visited wireless switch 222 by using the AWSL and configuration information for the home wireless switch 212 to the visited wireless switch 222. At step 804, the client 202 roams from the home wireless switch 212 to the visited wireless switch 222. The client 202 can keep its original client IP address and maintain IP connectivity while roaming from the first subnet 210 to the second subnet 220 using techniques which will now be described with reference to FIG. 9.

Figure 9:
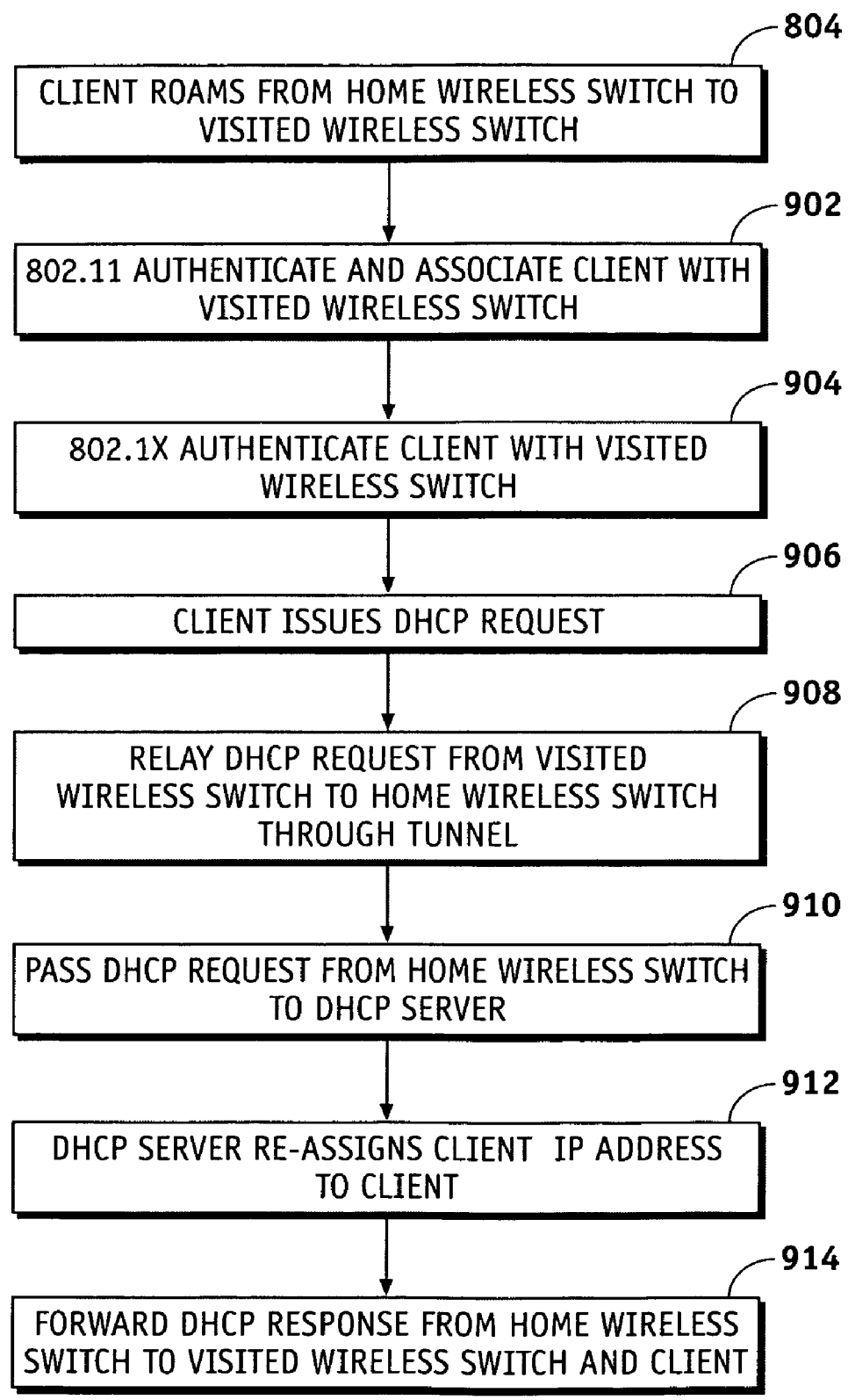
FIG. 9 is a flow chart showing exemplary message exchanges between the home wireless switch which supports a first subnet and the visited wireless switch which supports a second subnet to allow the client to maintain a client IP address when the client roams to the second subnet according to one exemplary embodiment.

FIG. 9 is a flow chart showing exemplary message exchanges between the home wireless switch 212, which supports a first subnet 210, and the visited wireless switch 222, which supports a second subnet 220, to allow the client 202 to maintain its original client IP address when the client 202 roams to the second subnet 220. At step 902, the client 202 is 802.11 authenticated and associated with the visited wireless switch 222, and at step 904, 802.1x authenticated with the visited wireless switch 222. At step 906, the client 202 issues a Dynamic Host Configuration Protocol (DHCP) request which is relayed, at step 908, from the visited wireless switch 222 to the home wireless switch 212 through the tunnel 215. At step 910, the DHCP request can then be passed from the home wireless switch 212 to the DHCP server 211. At step 912, the DHCP server 211 re-assigns the client IP address to the client, and at step 914, a Dynamic Host Configuration Protocol (DHCP) response can be forwarded from the home wireless switch 212 to the visited wireless switch 222 and the client 202.

Referring again to FIG. 8, at step 806, the active client list can be used to determine that the client IP address belongs to the first subnet 210 and that the client 202 was originally associated with the home wireless switch 212. The visited wireless switch 222 can obtain the client IP address from the registration information sent to the visited wireless switch 222 by registration server 230 when the visited wireless switch 222 registered with the registration server 230. At step 808, any IP packet sent from the client 202 and received by the visited wireless switch 222 can be forwarded to the home wireless switch 212 through the tunnel 215, and, at step 810, any IP packet received by the home wireless switch 212 can be forwarded through the tunnel 215 to the visited wireless switch 222 which forwards the IP packet to the client 202.

Referring again to FIG. 3, some of the ports 137 can couple the registration server 130 to the home wireless switch 212 and the visited wireless switch 222. The receiver 134 can receive registration information associated with each client from each of the wireless switches. The processor 135 can create an active client list (ACL) using the registration information from each client. The transmitter 132 can send a copy of the ACL to each wireless switch in the WLAN.

Referring again to FIG. 4, one of the ports 147 of the home wireless switch 212 can be coupled to one of the ports 137 of the visited wireless switch 212 via the UDP/IP tunnel. To enable the client to maintain the client IP address when the client roams from the home wireless switch 212 and the visited wireless switch 222, the client 202 802.11 authenticates with the visited wireless switch 222, 802.11 associates with the visited wireless switch 222, 802.1x authenticates with the visited wireless switch 222 and issues a Dynamic Host Configuration Protocol (DHCP) request to the visited wireless switch 222. The receiver 144 of the home wireless switch can receive the DHCP request from the visited wireless switch 22 through the tunnel, and the transmitter 142 of the home wireless switch 212 can send the DHCP request to a Dynamic Host Configuration Protocol (DHCP) server 211 which re-assigns the client IP address to the client 202. The transmitter 142 of the home wireless switch can send a DHCP response to the visited wireless switch and the client. The receiver 144 of the visited wireless switch 222 can receive the DHCP response from the home wireless switch 212.

The receiver 144 of the visited wireless switch 222 can receive an active client list from the registration server 230, and the processor 145 of the visited wireless switch 222 can use the active client list to determine that the client IP address belongs to the first subnet 210 and that the client 202 was originally associated with the home wireless switch 212. The processor 145 of the visited wireless switch 222 obtains the client IP address from the registration information sent to the registration server 230 by the client 202 when the home wireless switch 212 registered with the registration server 230. The processor 145 of the visited wireless switch 222 can search the record associated with the client 202 to get the home wireless switch 212 from the MAC address of the client 202. The transmitter 142 of the visited wireless switch 222 can send registration information for each client in the second subnet to the registration server. The receiver 144 of the visited wireless switch 222 can receive, after the client 202 has roamed from the home wireless switch 212 to the visited wireless switch 222, an IP packet sent from the client 202. The transmitter 142 of the visited wireless switch 222 can then send the IP packet through the UDP/IP tunnel to the home wireless switch 212. The receiver 144 of the home wireless switch can be coupled to the first port and can receive, after the client has roamed from the home wireless switch to the visited wireless switch, an IP packet sent from the visited wireless switch through the UDP/IP tunnel. This IP packet originates at the client.

Another one of the ports 147 can be coupled to the registration server. The receiver 144 of the home wireless switch can receive an active client list from the registration server. The processor 145 of the home wireless switch can use the active client list to determine that the client is now associated with the home wireless switch. The receiver 144 of the home wireless switch can receive a second IP packet addressed to the client. The transmitter 142 of the home wireless switch, which is coupled to the port, can send the second IP packet to the visited wireless switch through the UDP/IP tunnel. The visited wireless switch sends the second IP packet to the client. The receiver 144 of the visited wireless switch 222 can receive a second IP packet for the client 202 sent from the home wireless switch 212 through the UDP/IP tunnel.

Thus, numerous embodiments have been disclosed above which can provide techniques which support layer 3 IP roaming and allow a client to keep its original, pre-roam IP address and TCP/IP connection from its home subnet when the client undergoes a layer 3 roam to a new subnet. These techniques can help reduce the likelihood of dropped calls or sessions without requiring modification to the client software.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention. Thus, to the extent the description refers to certain features being "connected" or "coupled" together, unless expressly stated otherwise, "connected" or "coupled" means that one feature is directly or indirectly connected or coupled to another feature, and not necessarily mechanically. Although drawings depict exemplary arrangements of elements, additional intervening elements, devices, features, or components may be present in an actual embodiment assuming that the functionality of the circuit is not adversely affected. The connecting lines shown in the various figures represent example functional relationships and/or physical couplings between the various elements. Many alternative or additional functional relationships or physical connections may be present in a practical embodiment or implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A method for providing an active mobile communication device list to a plurality of wireless switches in a wireless local area network comprising a registration server, a plurality of active mobile communication devices, a plurality of access ports, and the plurality of wireless switches, comprising:

communicating registration information associated with each of the active mobile communication devices from corresponding access ports associated with the mobile communication devices to the wireless switches that support those active mobile communication devices;

communicating the registration information associated with each of the active mobile communication devices from the wireless switches over an IP tunnel to the registration server;

creating the active mobile communication device list at the registration server using the registration information for each active mobile communication device of each of the wireless switches, wherein the active mobile communication device list comprises a record for each active mobile communication device in the wireless local area network, wherein each record comprises registration information for a particular one of the active mobile communication devices, and wherein the record of each mobile communication device comprises a MAC address of the mobile communication device, a mobile communication device IP address of the mobile communication device, a home wireless switch of the mobile communication device, and a visited wireless switch of the mobile communication device; and communicating the active mobile communication device list from the registration server to each of the wireless switches so that each of the wireless switches has a record for each active mobile communication device in the wireless local area network.

2. The method of claim 1, wherein the record of each mobile communication device further comprises inactivity timers for the home wireless switch and the visited wireless switch and location information of the mobile communication device.

3. The method of claim 1, wherein each wireless switch is connected to each of the other wireless switches via tunnels, and further comprising:
communicating, from each wireless switch, the registration information for each active mobile communication device to each wireless switch.

4. The method of claim 1, wherein each wireless switch is connected to each of the other wireless switches via tunnels, and further comprising:
communicating, from each wireless switch, registration information updates to the registration server; and
communicating, from each wireless switch, the registration information updates to each of the other wireless switches in the wireless local area network.

5. The method of claim 1, further comprising:
communicating registration information updates to the registration server;
using the registration information updates received from the wireless switches to update the active mobile communication device list; and
communicating an updated active mobile communication device list including the registration information updates to the active mobile communication device list from the registration server to each wireless switch.

6. A wireless local area network, comprising:
a plurality of active mobile communication devices;
a plurality of access ports;
a plurality of wireless switches each being coupled to one or more of the access ports, wherein each wireless switch is connected to each of the other wireless switches via tunnels, wherein each of the active mobile communication devices communicates registration information to the wireless switch that supports the active mobile communication device via one of the access ports; and
a registration server, coupled to each of the wireless switches via an IP socket, configured to:

receive registration information for each of the active mobile communication devices from each of the wireless switches,
create an active mobile communication device list using the registration information for each active mobile communication device, wherein the active mobile communication device list comprises a record for each active mobile communication device in the wireless local area network, wherein each record comprises registration information for a particular one of the active mobile communication devices, and wherein the record of each mobile communication device comprises a MAC address of the mobile communication device, a mobile communication device IP address of the mobile communication device, a home wireless switch of the mobile communication device, and a visited wireless switch of the mobile communication device, and
communicate the active mobile communication device list to each of the wireless switches so that each of the wireless switches has a record for each active mobile communication device in the wireless local area network.

7. A wireless local area network of claim 6, wherein the registration server comprises:
a database configured to store the active mobile communication device list and registration information for each active mobile communication device.

8. The wireless local area network of claim 7, wherein the record of each mobile communication device further comprises inactivity timers for the home wireless switch and the visited wireless switch and location information.

9. The wireless local area network of claim 6, wherein the wireless switches send registration information updates to the registration server and then send the registration information updates to each of the wireless switches.

10. The wireless local area network of claim 7, wherein the wireless switches send registration information updates to the registration server, wherein the registration server uses the registration information updates received from the wireless switches to update the active mobile communication device list, and wherein the transmitter sends the registration information updates to the active mobile communication device list to each wireless switch as the registration information updates are received from the wireless switches.

11. A registration server configured for use in a wireless local area network comprising a plurality of active mobile communication devices and a plurality of other wireless switches, wherein the wireless switch is connected to each of the other wireless switches via tunnels, comprising:
a plurality of ports, wherein each port couples the registration server one of the other wireless switches via an IP socket;
a receiver configured to receive registration information for each active mobile communication device from the wireless switch that supports each active mobile communication device;
a processor configured to create an active mobile communication device list using the registration information for each active mobile communication device, wherein the active mobile communication device list comprises a record for each active mobile communication device in the wireless local area network, wherein each record comprises registration information for a particular one of the active mobile communication devices, and wherein the record of each mobile communication device comprises a MAC address of the mobile communication device, a mobile communication device IP address of the mobile communication device, a home wireless switch of the mobile communication device, and a visited wireless switch of the mobile communication device; and a transmitter configured to communicate the active mobile communication device list to each of the wireless switches so that each of the wireless switches has a record for each active mobile communication device in the wireless local area network.

12. The registration server of claim 11, wherein the record of each mobile communication device further comprises inactivity timers for the home wireless switch and the visited wireless switch and location information of the mobile communication device.

13. A registration server of claim 11, further comprising:

a database configured to store the active mobile communication device list and registration information for each active mobile communication device.

14. The registration server of claim 11, wherein the receiver is configured to receive registration information updates from each of the other wireless switches, wherein the processor is configured to use the registration information updates to create an updated active mobile communication device list, and wherein the transmitter is configured to send the registration information updates to each of the other wireless switches.

15. A wireless switch coupled to a plurality of access ports and being configured for use in a wireless local area network comprising a plurality of active mobile communication devices, a registration server and a plurality of other wireless switches, comprising:

a receiver configured to receive, via access ports coupled to the wireless switch, registration information associated with each of the active mobile communication devices that the wireless switch supports; and a plurality of tunnel endpoints which couple the wireless switch to the other wireless switches via corresponding tunnels;

a port configured to couple the wireless switch to the registration server via an IP socket; and a transmitter configured to transmit the registration information to the registration server, wherein the receiver is configured to receive the an active mobile communication device list from the registration server, wherein the active mobile communication device list comprises a record for each of the active mobile communication devices in the wireless local area network, wherein each record comprises registration information for a particular one of the active mobile communication devices, and wherein the record of each mobile communication device comprises a MAC address of the mobile communication device, a mobile communication device IP address of the mobile communication device, a home wireless switch of the mobile communication device, and a visited wireless switch of the mobile communication device.

16. A wireless switch of claim 15, wherein the record of each mobile communication device further comprises inactivity timers for the home wireless switch and the visited wireless switch and location information.

17. The wireless switch of claim 15, wherein the receiver is configured to receive registration information updates from each of the active mobile communication devices the wireless switch supports, and wherein the transmitter is configured to send the registration information updates to the registration server.

18. The wireless switch of claim 17, wherein the transmitter is configured to send the registration information updates to each of the other wireless switches in the wireless local area network via the tunnels.

19. The wireless switch of claim 15, wherein the receiver is configured to receive the an updated active mobile communication device list from the registration server which includes the registration information updates received from each of the wireless switches.

20. The method of claim 1, wherein the registration server is implemented at one of the wireless switches.

* * * * *

UNITED STATES PATENT AND TRADEMARK OFFICE
CERTIFICATE OF CORRECTION

PATENT NO. : 7,515,573 B2  Page 1 of 1
APPLICATION NO. : 11/116660
DATED : April 7, 2009
INVENTOR(S) : Bajic It is certified that error appears in the above-identified patent and that said Letters Patent is hereby corrected as shown below:

ON THE TITLE PAGE

On the Title Page, in Item (54), in Title, in Column 1, Line 4, delete "(WLANS)" and insert -- (WLANs) --, therefor.

On the Title Page on Page 2, in Item (56), under "OTHER PUBLICATIONS", in Column 2, Lines 13-14, delete "Artlicle-Plug-in-architechture/plug_architecture.html>" and insert -- Article-Plug-in-architecture/plugin_architecture.html> --, therefor.

On the Title Page on Page 2, in Item (56), under "OTHER PUBLICATIONS", in Column 2, Line 25, delete "ITEF," and insert -- IETF, --, therefor.

On the Title Page on Page 2, in Item (56), under "OTHER PUBLICATIONS", in Column 2, Line 49, delete "Techical" and insert -- Technical --, therefor.

IN THE SPECIFICATION

In Column 1, Line 4, delete "(WLANS)" and insert -- (WLANs) --, therefor.

In Column 5, Line 41, delete "use." and insert -- use --, therefor.

IN THE CLAIMS

In Column 22, Line 5, in Claim 15, delete "the an" and insert -- the --, therefor.

In Column 22, Line 34, in Claim 19, delete "the an" and insert -- the --, therefor.

Signed and Sealed this

Sixteenth Day of March, 2010

David J. Kappos
*Director of the United States Patent and Trademark Office*